United States Patent [19]

Smith, Jr. et al.

[11] Patent Number: 5,025,223
[45] Date of Patent: Jun. 18, 1991

[54] FLATNESS TESTER

[75] Inventors: Tempel Smith, Jr.; Veselko Miletic, both of Chicago; George Bayer, Kildeer; Christopher A. Coutre, Addison; William L. Reichel, Chicago; Mirek J. Chronowski, Niles, all of Ill.

[73] Assignee: Tempel Steel Company, Niles, Ill.

[21] Appl. No.: 383,616

[22] Filed: Jul. 24, 1989

[51] Int. Cl.⁵ ............................................. G01R 27/26
[52] U.S. Cl. ...................................... 324/662; 324/671
[58] Field of Search .................... 324/61 R, 61 P, 661, 324/662, 671

[56] References Cited

U.S. PATENT DOCUMENTS

| 3,984,767 | 10/1976 | Denton et al. | 324/61 R |
| 4,182,981 | 1/1980 | Shum et al. | 324/61 R |
| 4,491,787 | 1/1985 | Akiyama et al. | 324/61 P |
| 4,560,924 | 12/1985 | Nordberg | 324/73 |
| 4,736,638 | 4/1988 | Okawa et al. | 73/304 C |
| 4,855,667 | 8/1989 | Hendrick et al. | 324/61 P |

FOREIGN PATENT DOCUMENTS 624154 9/1978 U.S.S.R. .......................... 324/61 R

*Primary Examiner*—Kenneth Wieder
*Assistant Examiner*—Maura K. Regan
*Attorney, Agent, or Firm*—Marshall, O'Toole, Gerstein, Murray & Bicknell

[57] ABSTRACT

Apparatus for determining an overall dimension of an electrically conductive object includes a support surface for receiving the object, an electrically conductive plate movable toward and away from the support surface along a path normal to such surface, the plate having a facing surface which faces the support surface and a voltage source for applying first and second electrical potentials to the object and the plate, respectively, to establish a voltage therebetween. A transducer is provided for developing a distance signal representing the distance between the facing surface and the support surface. A motor moves the plate toward the object while the object is received by the support surface and circuitry is provided for detecting when the voltage between the object and the plate disappears due to contact of the plate with the object whereby the distance signal at such time is representative of the overall dimension.

13 Claims, 3 Drawing Sheets

FIG. 3

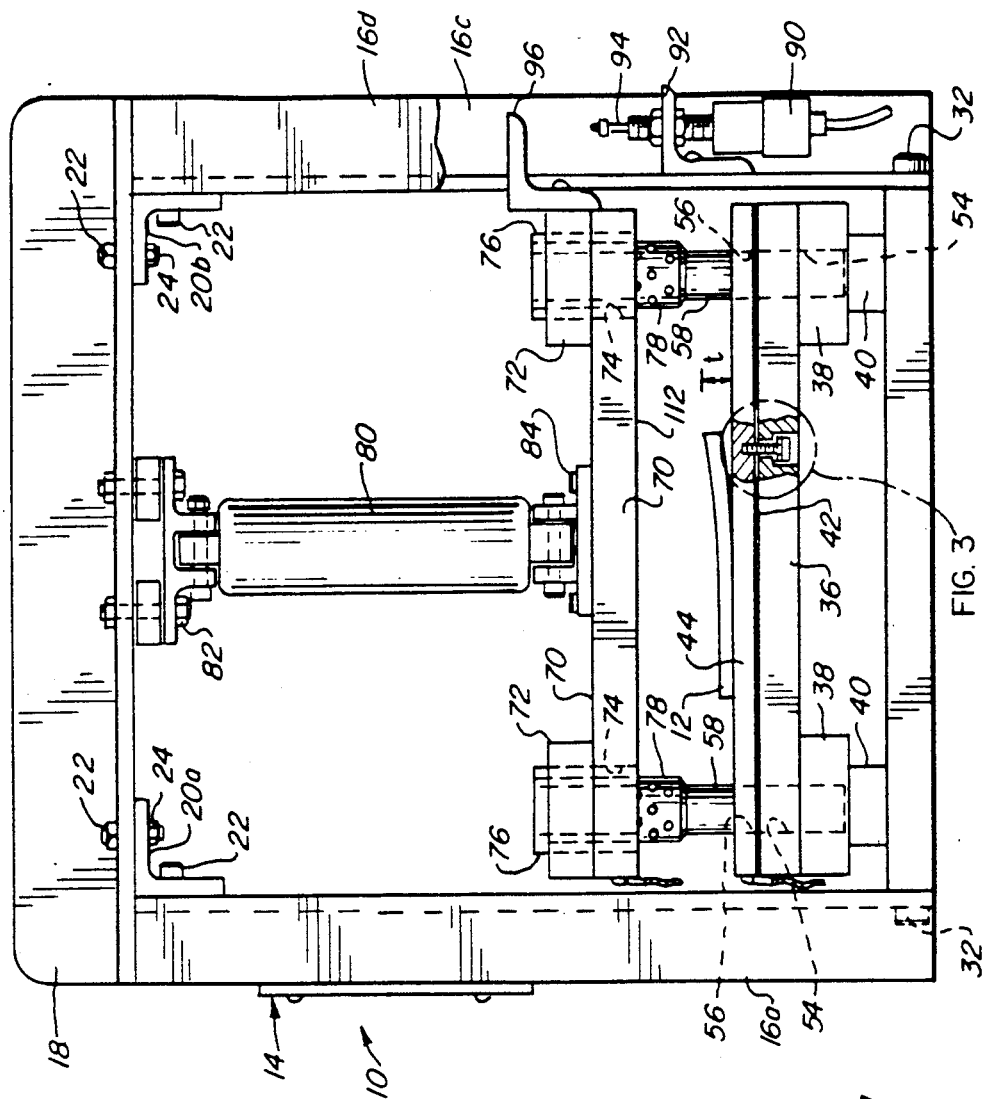

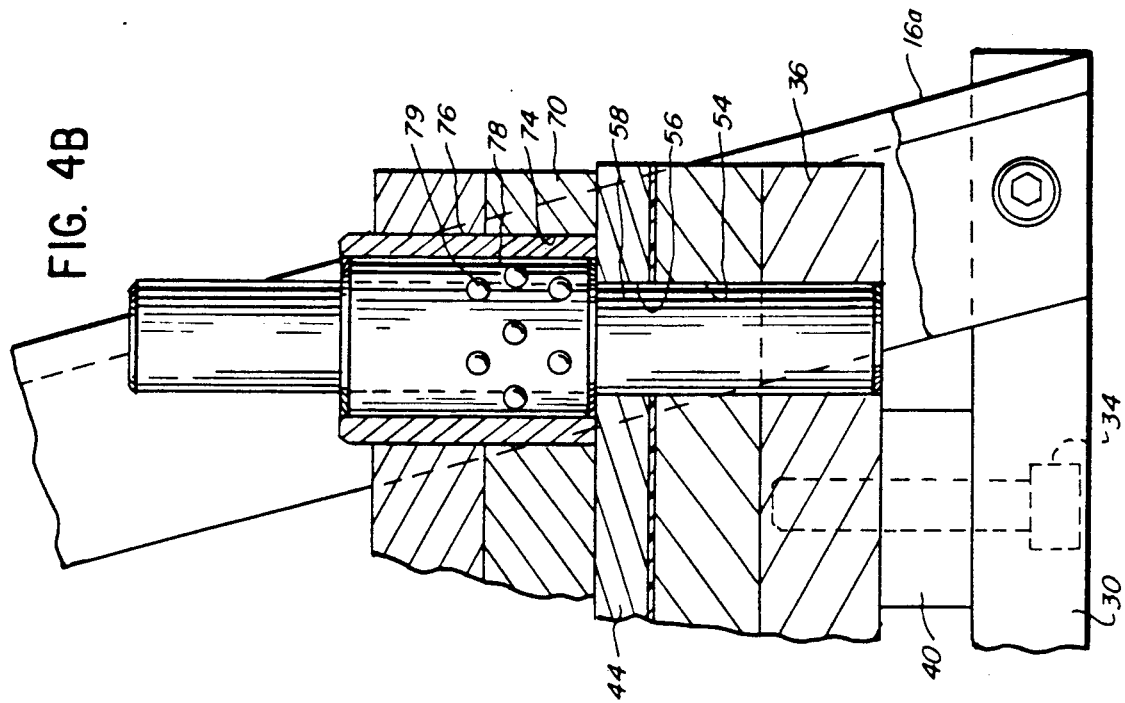
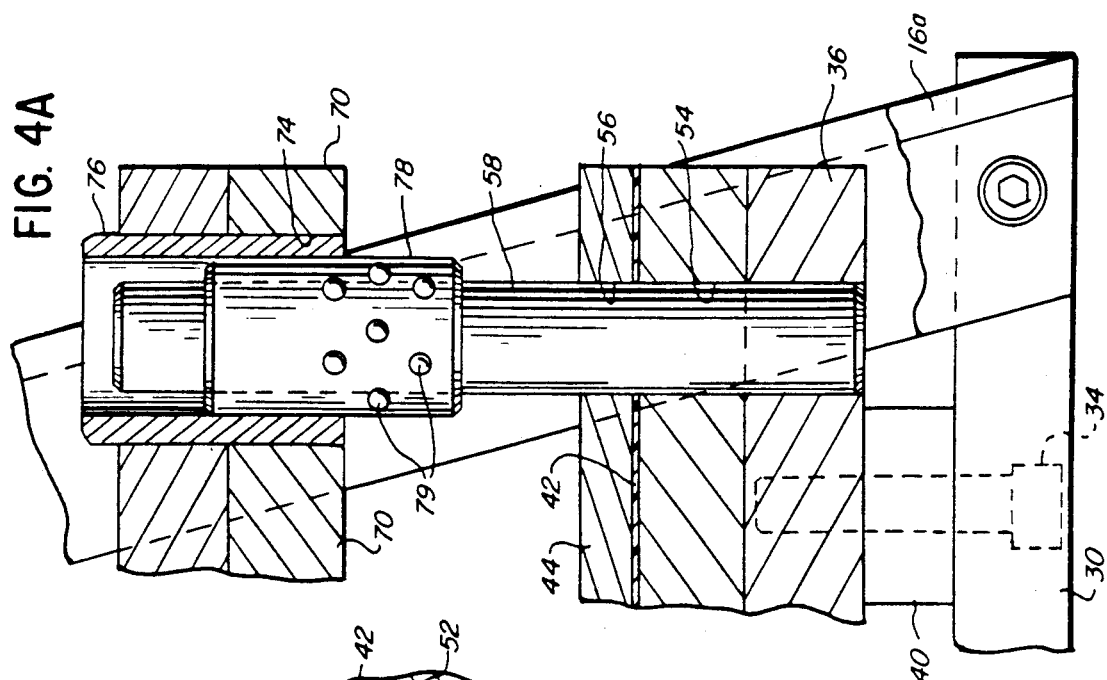
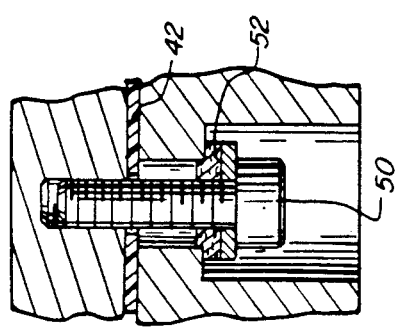

FLATNESS TESTER

TECHNICAL FIELD

The present invention relates generally to testing apparatus, and more particularly to a tester for determining the flatness of an object.

BACKGROUND ART

There are numerous occasions when it is necessary to determine the flatness of an article. For example, magnetic steel laminations produced by a stamping operation must be held within a specified degree of flatness so that a lamination stack of specified width contains the proper volume of material. By checking random samples of lamination stampings, one can take corrective action to keep flatness within the specified limits by adjusting the stamping machine and/or using different material for the stampings.

Norberg U.S Pat. No. 4,560,924 discloses a flatness measuring apparatus including oppositely disposed capacitive probes which move across a flat reference surface and an object surface, respectively, as a carriage is moved in lateral increments. A first capacitor is formed by one of the probes and the object surface, while a second capacitor is formed by the remaining probe and the reference surface. The capacitances of the two capacitors are translated into distance values which are utilized to generate numerical information describing the flatness of the object surface.

SUMMARY OF THE INVENTION

In accordance with the present invention, the overall dimension of an electrically conductive object is determined by a tester of simple and reliable design.

More particularly, the tester of the present invention includes a support surface for receiving an object which is to be tested, an electrically conductive plate movable toward and away from the support surface along a path normal to such surface wherein the plate has a facing surface which faces the support surface and means for forming an electrical characteristic between the object and the plate. Means are provided for developing a distance signal representing the distance between the facing surface and the support surface, together with means for moving the plate toward the object while the object is received by the support surface. Means are further provided for detecting when the electrical characteristic between the object and the plate changes due to contact therebetween whereby the distance signal at such time is representative of the overall dimension.

In the preferred embodiment, the forming means comprises a voltage source which applies first and second electrical potentials to the object and the plate, respectively, to establish a voltage therebetween. The detecting means comprises a voltage comparator coupled to the object and the plate and a flip-flop coupled to the voltage comparator wherein the flip-flop includes an output which is set when a switch is actuated at the beginning of a measuring sequence and which is reset when the voltage between the object and the plate disappears. The resetting of the output of the flip-flop in turn causes a track and hold circuit to immediately latch the distance signal and, in addition, causes the moving means to reverse the direction of motion of the plate so that it is moved away from the object. The latched distance signal may be provided to a computer which in turn receives the output of a thickness gauge. The thickness gauge provides a thickness signal representing the thickness of the object at a localized portion thereof. The computer develops an indication of the flatness of the object from the thickness signal and the latched position signal.

The flatness tester of the present invention is extremely simple in design and hence is reliable and extremely accurate.

BRIEF DESCRIPTION OF THE DRAWINGS

FIG. 1 is a front elevational view of the mechanical details of the flatness tester of the present invention;

FIG. 2 is a side elevational view of the flatness tester shown in FIG. 1;

FIG. 3 is an expanded view of a part of the flatness tester of FIG. 1 illustrating the attachment of the bottom contact plate to the anchor plate illustrated in FIG. 1;

FIG. 4A is a fragmentary enlarged view of the guide post, bearing cage and guide bushing of FIG. 2;

FIG. 4B is a view of the components of FIG. 4A when the upper contact plate is in contact with the lower contact plate.

DESCRIPTION OF THE PREFERRED EMBODIMENT

Figure 5:
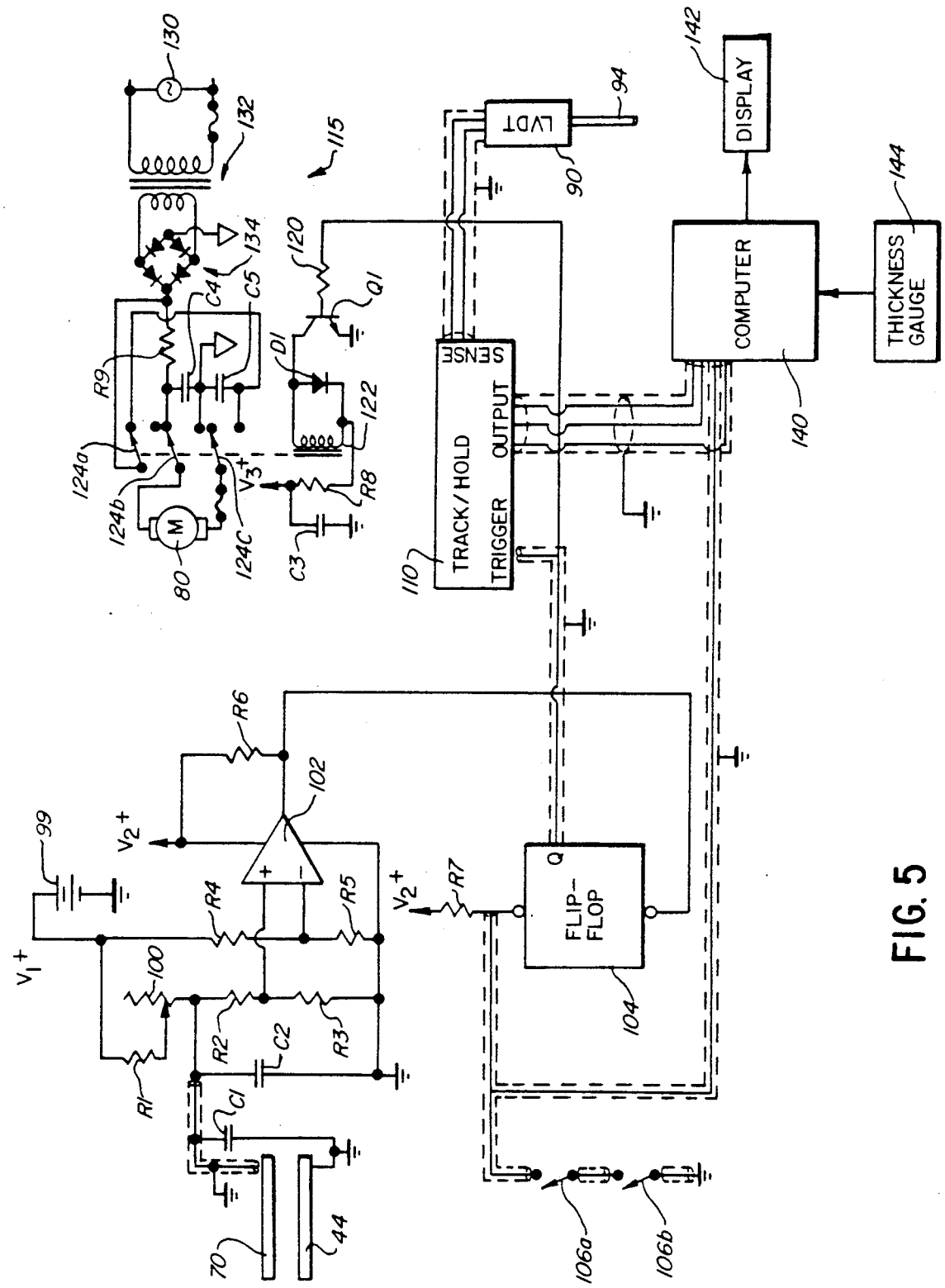
FIG. 5 is a combined schematic and block diagram of the electrical details of the flatness tester illustrated in FIG. 1, together with a computer, display and thickness gauge.

Referring now to FIG. 1, there is illustrated an apparatus 10 for determining the overall dimension of an object 12, illustrated in FIGS. 1 and 2 as an electrically conductive lamination stamping fabricated of, for example, magnetic steel. The object 12 is shown with an exaggerated bend to illustrate the principles of operation of the apparatus 10. While the present invention is particularly useful in determining the flatness of such a stamping, it should be noted that the apparatus 10 is not restricted to such use, and in fact can be used to determine the overall dimension of another object. As used herein, the term "overall dimension" denotes the distance "t", which not only takes into account the thickness of the object 12 at a localized point, but also the dimension due to the bend therein.

The apparatus 10 includes a frame 14 fabricated of aluminum or other lightweight material. The frame 14 includes four support members in the form of trusses 16a–16d (only portions of the trusses 16c and 16d are visible in the Figures), all of which are joined to a bridge 18 by angled brackets 20a,20b, bolts 22 and nuts 24. The trusses 16a–16d are further secured to a rectangular base 30 by means of bolts 32. A wiring bracket 33 is secured to the trusses 16a,16b and supports wires connected to electrical components of the tester.

Secured to the base 30 by means of bolts 34 is an anchor plate 36. The anchor plate rests on pads 38 which are in turn elevated by shims 40. Disposed on an upper face of the anchor plate 36 is an insulating polycarb spacer 24, visible in FIG. 3, and a first or lower electrically conductive contact plate 44. The lower contact plate 44 includes a generally horizontal support surface 46 which receives the object 12.

As seen in FIG. 3, the lower contact plate 44 is secured to the anchor plate 36 by means of bolts 50, each of which is threaded into a threaded aperture in the contact plate 44. The contact plate 44 is electrically isolated from the anchor plate 36 by means of the polycarbonate spacer 42 and an insulative washer 52.

Four cylindrical bores 54 are formed within the anchor plate 36 and the pads 38. These bores are aligned with four corresponding cylindrical bores 56 in the lower contact plate 44. Four guideposts 58 are press-fitted within the aligned bores 54 and 56, and are disposed in parallel relation to one another normal to the surface 46 of the lower contact plate 44.

An upper contact plate 70 having a facing surface 71 includes four pads 72. Four cylindrical bores extend through the pads 72 and the balance of the contact plate 70. As seen in enlarged detail in FIG. 4A, a guide bushing 76 is press-fitted within each bore 74, and disposed within each guide bushing 76 is a ball bearing cage 78. The ball bearing cages 78 are cylindrical and circular in cross-section, as are the guideposts 58. The guideposts 58 are received within the ball bearing cage 78 and the cages 78 have an outer diameter less than the inner diameter of the guide bushings 76 and an inner diameter greater than the outer diameter of the guideposts 58. Each ball bearing cage 78 includes apertures in which ball bearings 79 are loosely retained. The diameters of the ball bearings exceed the difference in dimension between the inner diameter of the guide bushing 76 and the outer diameter of the associated guidepost 58 by a certain amount, such as 0.001 inch. The foregoing arrangement permits the upper plate 70 to be moved vertically with respect to the lower contact plate 44 without lateral shifting. During such movement, the bearing cages 78 move at a fraction, such as one-half, of the speed of the upper plate 70.

A linear DC motor 80 is connected by means of clevises 82 and 84 to the bridge 18 and the upper contact plate 70, respectively. The motor 80 is operable to displace the upper contact plate 70 relative to the lower contact plate 44 in a fashion to be described in greater detail hereinafter.

A position transducer in the form of a linear variable differential transducer (LVDT) 90 is secured by means of a bracket 92 to the truss 16c. A spring-loaded movable plunger 94 of the LVDT 90 is contacted by a bracket 96 which is secured to the upper contact plate 70 when the plate 70 moves to within a particular distance of the lower plate 44. As should be evident, movement of the upper contact plate 70 relative to the lower contact plate 44 within the particular distance causes the plunger 94 to extend or retract, thereby causing the electrical output of the LVDT 90 to change in response thereto.

Referring now to FIG. 5, an electrical potential $V_1+$ of, for example, 30 volts is provided by a voltage source 99 which is coupled to a potentiometer 100, a resistor R1 and capacitors C1 and C2. The upper contact plate 70 is connected by a voltage divider comprising resistors R2 and R3 to a non-inverting input of an operational amplifier ("op amp") 102. An inverting input of the op amp 102 receives a reference voltage produced by a voltage divider comprising resistors R4 and R5 which are in turn coupled to the voltage source 99.

The op amp 102 receives a supply voltage $V_2+$, which is also provided to an output of the op amp 102 by a resistor R6. The output of the op amp 102 is coupled to a first or preset input of a D-type flip-flop 104. A second or clear input of the flip-flop 104 receives the voltage $V_2+$ through a resistor R7. A junction between the second input of the flip-flop 104 and the resistor R7 is coupled by one or more series-connected switches 106a,106b which are in turn connected to ground potential.

An output Q of the flip-flop 104 is coupled to a trigger input of a track and hold circuit 110. A sensing input of the track and hold circuit 110 receives a differential distance signal produced by the LVDT 90. As noted previously, the distance signal produced by the LVDT 90 is a function of the extension of the plunger 94, and hence, the distance between the receiving surface 46 of the bottom contact plate 44 and the facing surface 71 of the upper contact plate 70.

The Q output of the flip-flop 104 is further coupled to a motor controller 115 having a resistor 120 and a transistor Q1 which is in turn coupled to a reversing relay coil 122. The transistor Q1 controls the energization of the coil 122 by a voltage $V_3+$ through a resistor R8 and a capacitor C3. A diode D1 is coupled across the relay coil 122 to dissipate reactive currents developed during switching of the coil 122.

The relay coil 122 controls three reversing relay contactors 124a, 124b and 124c. These contactors control the application of power to the motor 80 to in turn control the direction of movement thereof. This power is supplied by an AC power source 130, a transformer 132, a rectifier bridge 134, a resistor R9 and a pair of capacitors C4 and C5.

A computer 140 is coupled to the switches 106A and 106B and further receives a latched output produced by the track and hold circuit 110. The computer 140 is in turn coupled to a display 142. An electronic thickness gauge 144 develops a signal, described in greater detail, which is in turn provided to the computer 140.

As illustrated by the diagrams, shielded cable may be used between several or all of the components illustrated in FIG. 4 to improve noise immunity.

The operation of the tester illustrated in the figures will now be described under the assumption that the object 12 is placed on the receiving surface 46 of the lower contact plate 44 and that the upper contact plate 70 is stationary and spaced from the lower contact plate by the amount shown in FIGS. 1 and 2. At the beginning of a measuring sequence, initiated by closure of both of the switches 106A and 106B, the Q output of the flip-flop 104 is set so that a high-state signal is provided to the trigger input of the track and hold circuit 110 and to the transistor Q1. The motor 80 is thus energized to move the upper contact plate 70 toward the lower contact plate 44. Once the upper contact plate 70 is moved into contact with the object 12, the electrical potential established across the plates 70 and 44 disappears, in turn causing the output of the op amp 102, which acts as a voltage comparator and produces a comparison signal representing the voltage across the plates 44 and 70, to switch to a high state. This high-state signal in turn resets the Q output of the flip-flop 104 so that a low-state signal is provided to the trigger input of the track and hold circuit 110 and to the transistor Q1. In response to this low-state input, the track and hold circuit 110 latches or holds a signal at its output which is representative of the distance signal delivered by the LVDT 90 to the sense inputs. This output is provided to the computer 140 which stores same and which may display such value on the display 142.

The low-state output of the flip-flop 104 also causes the transistor Q1 to de-energize the relay coil 122, in turn causing the contactors 124A–124C to reverse the polarity of the voltage applied to the motor 80 so that the motor reverses direction and retracts the upper contact plate from the lower contact plate.

It should be noted that the motor 80 includes an integral limit switch which de-energizes the motor upon complete retraction thereof.

Following the above-described measuring sequence, an operator removes the object 12 from between the plates 44 and 70 and measures the thickness of the object at a localized portion thereof using the thickness gauge 144. The thickness gauge may be of a commercially available type, such as a Mitotoyo Digimatic Micrometer, Model No. 293-715 (0"—1"). The output of the thickness gauge is provided to the computer 140 which provides the information on the display 142 so that an operator can determine the flatness of the object 12.

It should be noted that the computer 140, display 142 and thickness gauge 144 are optional and need not be utilized. Instead, one may ascertain the flatness of an object by knowing its localized thickness in advance and mentally comparing such figure against the output of the track and hold circuit 110.

We claim:

1. Apparatus for determining an overall dimension of an object, comprising:
   a support surface for receiving the object;
   an electrically conductive plate movable toward and away from the support surface along a path normal to such surface, the plate having a facing surface which faces the support surface;
   means for forming an electrical characteristic between the object and the plate;
   means for developing a distance signal representing the distance between the facing surface and the support surface;
   means for moving the plate toward the object while the object is received by the support surface; and
   means for detecting when the electrical characteristic between the object and the plate changes due to contact of the plate with the object whereby the distance signal at such time is representative of the overall dimension.

2. The apparatus of claim 1, wherein the developing means comprises a linear variable differential transducer.

3. Apparatus for determining an overall dimension of an electrically conductive object, comprising:
   a support surface for receiving the object;
   an electrically conductive plate movable toward and away from the support surface along a path normal to such surface, the plate having a facing surface which faces the support surface;
   means for forming an electrical characteristic between the object and the plate wherein the forming means comprises means for applying first and second electrical potentials to the object and the plate, respectively, to establish a voltage therebetween;
   means for developing a distance signal representing the distance between the facing surface and the support surface;
   means for moving the plate toward the object while the object is received by the support surface; and
   means for detecting when the electrical characteristic between the object and the plate changes due to contact of the plate with the object whereby the distance signal at such time is representative of the overall dimension.

4. The apparatus of claim 3, wherein the detecting means comprises means for determining when the voltage between the object and the plate disappears.

5. The apparatus of claim 3, further including means responsive to the detecting means and coupled to the developing means for latching a further signal representing the distance signal when the voltage between the object and the plate disappears.

6. The apparatus of claim 5, wherein the latching means comprises a track and hold circuit.

7. The apparatus of claim 3, wherein the moving means comprises a linear motor and further including means for reversing the linear motor to move the plate away from the object when the voltage therebetween disappears.

8. The apparatus of claim 3, wherein the detecting means comprises a voltage comparator coupled to the object and the plate and a flip-flop coupled to the voltage comparator.

9. The apparatus of claim 8, further including a switch which is actuable to cause the plate to move toward the object at the beginning of a measuring sequence and wherein the flip-flop includes an output which is set when the switch is actuated and which is reset when the voltage between the object and the plate goes to zero.

10. The apparatus of claim 9, wherein the moving means comprises a motor controlled by a motor control circuit responsive to the output of the flip-flop whereby the motor moves the plate toward the object when the flip-flop output is set and whereby the plate is moved away from the object when the flip-flop output is reset.

11. A flatness tester, comprising:
    first and second spaced electrically conductive plates, the first plate being stationary and having a generally horizontal upper surface and the second plate being movable toward and away from the first plate along a generally vertical path;
    means coupled to the first and second plates for developing a voltage across same;
    a reversible linear motor coupled to the upper plate;
    a motor controller coupled to the motor for controlling same;
    a voltage comparator coupled to the first and second plates which develops a comparison signal representing the voltage across the plates;
    a flip-flop coupled to the voltage comparator and the motor control having an output which is set when a switch is closed to thereby cause the motor control to operate the motor such that the second plate is moved toward the first and which is reset by the comparison signal developed by the voltage comparator when the voltage across the plates is reduced to substantially zero due to contact of the second plate with an electrically conductive object disposed on the upper surface of the first plate;
    a position transducer which develops a distance signal representing the distance between the first and second plates; and
    a track and hold circuit coupled to the position transducer and the flip-flop which is actuated to latch a further signal representing the distance signal when the flip-flop output is reset whereby the latched further signal represents the overall width of the object.

12. The flatness tester of claim 11, further including a thickness gauge which develops a thickness signal representing the thickness of the object at a localized portion thereof and a computer coupled to the thickness gauge and to the track and hold circuit which develops an indication of the flatness of the object from the thickness signal and the latched further signal.

13. The flatness tester of claim 11, wherein the motor control includes a reversing relay operated by the flip-flop to cause the second plate to be moved away from the first plate when the flip-flop output is reset.

* * * * *